United States Patent Office 2,970,820
Patented Feb. 7, 1961

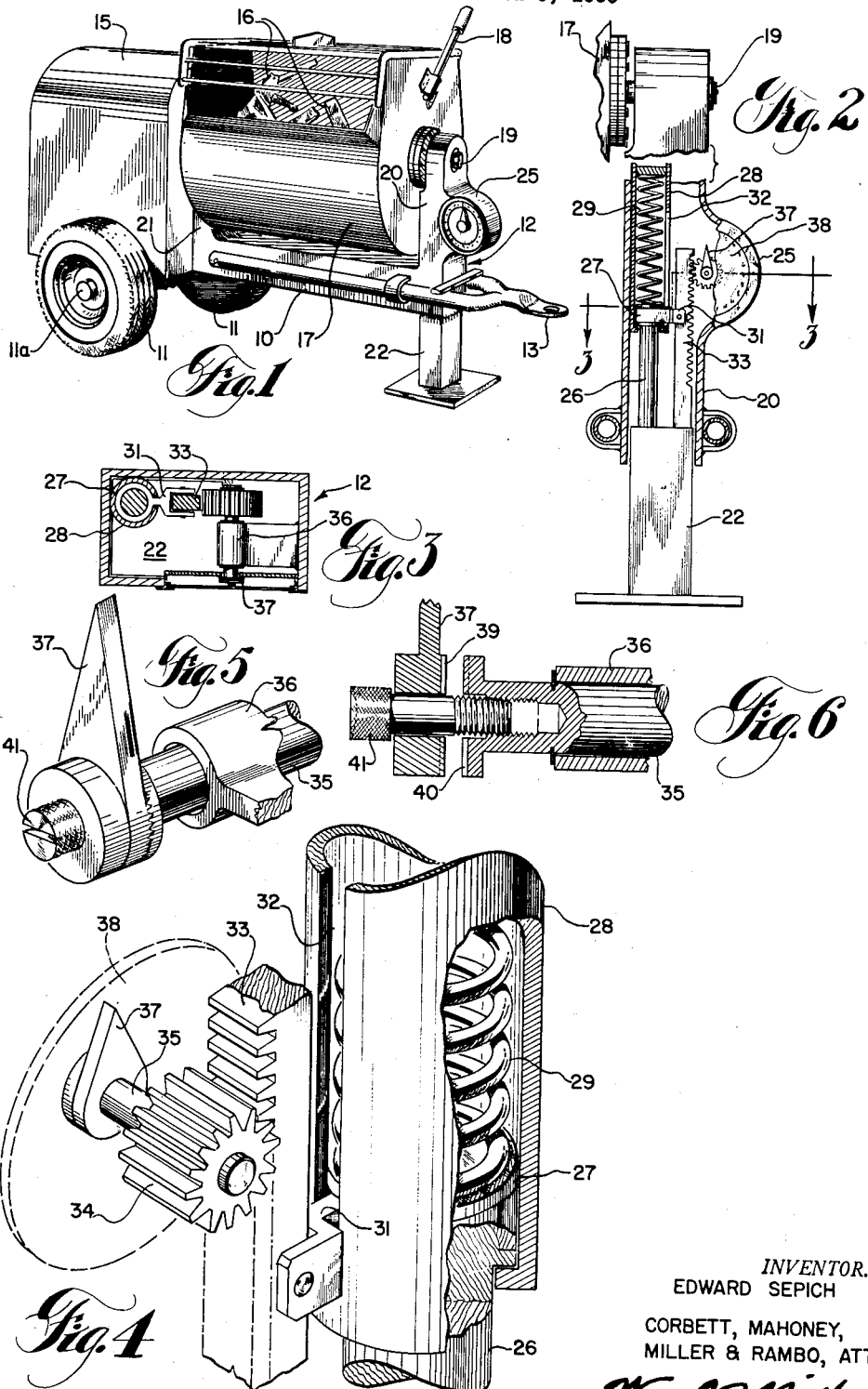

2,970,820

CONSTRUCTION MATERIAL MIXER WITH BATCH GAUGE

Edward Sepich, 3185 Eakin Road, Columbus 4, Ohio

Filed Mar. 5, 1959, Ser. No. 797,479

2 Claims. (Cl. 259—171)

My invention relates to a construction material mixer with batch gauge. It has to do, more particularly, with a mixer of the portable type usually employed in mixing batches of mortar or plaster on the job site. In the following description I will refer to the mixer as being used for mixing mortar but it is to be understood that it is capable of other uses.

In mortar mixers or other mixers, it is important that the batch mixed in the mixer be of the usual materials in accurate proportions. At the present time, it is customary to shovel into the mixing drum a predetermined number of shovelfuls of each material. However, sometimes the count is lost or there is an error. Also, each shovelful is not always the same and may be light or heavy. Consequently, it can be seen that this is not an accurate procedure and, therefore, results in batches which are not standard and uniform and which may not be up to the architect's specifications for the construction job.

The portable mixer commonly used for jobs of this type, generally comprises a chassis or frame which supports the mixing drum and a driving engine therefor. The frame is carried at one end by a pair of wheels and at the other end there is provided a supporting standard or pedestal and an associated tongue by means of which the mixer can be pulled behind a truck or other vehicle. When attached to a vehicle by the tongue, the lower end of the pedestal does not contact the surface.

According to my invention, I provide in the pedestal, actuating means which is affected by the pressure on the pedestal at the time the mixer rests on the wheels and the pedestal. This pressure actuates a suitable gauge or indicator which indicates the amount of pressure on the pedestal. As the drum is supplied with material, this pressure increases since the pedestal end of the frame will be swung downwardly with the wheel axles as the pivot axis.

In the use of this mixer, the ingredients of one batch will be supplied with extreme accuracy and the indication on the gauge for each ingredient will be noted. Then, in making subsequent batches it is merely necessary to add material until the previous indication on the gauge is duplicated for each material. The result will be accurate, uniform batches.

In the accompanying drawing, I have illustrated the preferred embodiment of my invention and in this drawing:

Figure 1 is a perspective view of a mixer in which my invention is embodied.

Figure 2 is an enlarged vertical sectional view through the pedestal showing the gauge-actuating mechanism and gauge.

Figure 3 is a horizontal sectional view taken along line 3—3 of Figure 2.

Figure 4 is a perspective view, partly broken away, of the gauge-actuating mechanism and gauge.

Figure 5 is an enlarged detail in perspective of the indicator pointer and mounting means of the gauge.

Figure 6 is an axial sectional view through the parts of Figure 5.

With reference to the drawing, in Figure 1 I have illustrated a mixer of the portable trailer type in which my invention may be embodied. The mixer comprises a chassis or frame 10 which is supported at its rear or trailing end by a pair of wheels 11 and at its forward or leading end by an upright standard or pedestal 12. The chassis 10 may be pulled by means of a retractable tongue 13 which is connected to the frame 10 for limited sliding movement. The frame carries a housing 15 in which a driving motor (not shown) is provided for driving the mixing blades 16 disposed within a mixing drum 17 which is tiltably mounted on the frame for tilting about a horizontal longitudinal axis 19, a handle 18 being attached to the drum to facilitate the tilting. The upright pedestal 12 includes an upstanding hollow section 20 which may be rigidly attached to the frame 10 at the front end thereof and which supports at its upper end the adjacent end of the drum 17. The other end of the drum is supported by another upstanding part 21 of the frame, only a portion of which is shown, which is adjacent the housing 15. The lower part of the pedestal 12 is provided by a foot member 22 which telescopes upwardly within the hollow part 20 of the pedestal. The telescoping members 22 and 20 are shown as being of square cross-section to prevent relative rotation but may be of other forms.

Movement of the foot member 22 of the pedestal 12 upwardly into the hollow section 20 is adapted to operate a gauge indicated at 25 which may be on the upper portion of the standard. For this purpose, there is provided within the section 20 pressure-operated gauge-actuating mechanism. This mechanism includes an upwardly extending plunger rod 26 which is rigidly connected at its lower end to the foot member 22. The upper end of this rod is provided with an enlargement 27 which moves vertically within a cylinder 28 that is attached to the inner surface of the section 20 in a fixed vertical position. Within the cylinder 28 is a compression spring 29.

The piston or enlargement 27 is provided with a radial extension 31 which projects out through a vertical slot 32 in the cylinder 28 and which is rigidly attached to a rack 33 that moves vertically in the hollow section 20. This rack 33 meshes with a pinion 34 which is keyed to the inner end of an indicator shaft 35 of the gauge 25. This shaft is rotatably mounted in a bearing 36, carried by the gauge housing, and its outer end carries a pointer or hand 37 which sweeps around a dial or calibrated face 38. The hub of the pointer is provided with a radially ribbed surface 39 for clamping against a complemental surface 40 on the outer end of the shaft 35, the clamping and release being accomplished by means of a clamping screw 41 which engages the outer surface of the hub and is threaded into the outer end of the shaft 35. This arrangement permits of proper and accurate setting of the pointer or hand 37 relative to the dial 38.

During pulling of the mixer by a vehicle by means of the tongue 13, the foot member 22 will be off the surface, its lowermost position being shown in Figure 2, where piston 27 engages the lower end of the cylinder 28. In the use of this mixer, when it reaches the job site, it is released from the pulling vehicle and allowed to rest, as indicated in Figure 1, being supported on the wheels 11 at one end and on the pedestal foot member 22 at the other end. Each of the ingredients of a specified batch is then successively and very accurately supplied in the drum 17. The weight of each ingredient will cause the front end of the frame to move downwardly, pivoting about the axis 11a which corresponds to the wheel axis. This downward swinging of the front end of the frame 10 will tend to telescope the pedestal section 20 farther downwardly over the shoe member 22 against the force of the spring 29. This will, in turn, move the rack bar 33 upwardly within the section 20 and turn the pointer 37. For each batch ingredient, the position of the pointer on the dial 38 will be noted. In subsequent batches, it is merely necessary to shovel in material until the same position of the pointer 37 on the dial 38 is reached.

It will be apparent that my invention provides in a trailer-type portable mixer supported by a pair of wheels at one end and a pedestal at the other end a pedestal which is of sections which will telescope or move relatively in accordance with pressure produced by material supplied into the mixing drum, the relative movement being indicated by a gauge operatively connected with the sections.

It will be understood that with this gauge arrangement incorporated in the mixer, it is possible to obtain accurate batches with little possibility of mistake. No counting of shovelfuls is necessary since it is merely necessary to observe the position of the pointer 37 on the dial 38 as material is added into the drum 17. The pressure of the weight of this material acts on the spring and plunger mechanism to actuate the indicator of the gauge.

According to the provisions of the patent statutes, the principles of this invention have been explained and have been illustrated and described in what is now considered to represent the best embodiment. However, it is to be understood that within the scope of the appended claims, the invention may be practiced otherwise than as specifically illustrated and described.

Having thus described this invention, what is claimed is:

1. A mixer comprising a frame carrying a mixing receptacle, support means contacting the ground or other surface and pivotally connected to the frame for supporting the frame for vertical swinging movement, a standard for supporting the other end of the frame spaced from said support means and composed of relatively movable sections which are connected to the frame and engage the ground respectively, means for normally keeping the sections in extended relationship, and means operatively connected between the sections for registering the relative movement of said sections caused by supplying material into said receptacle to indicate the weight of material in the receptacle.

2. A mixer according to claim 1 in which the receptacle is a drum and the ground contacting support means are wheels pivoted on axles carried by the frame, said relatively movable sections comprising a pair of telescoping sections, said means for keeping the sections extended comprising a spring plunger, said registering means including a gauge operatively connected to said plunger.

References Cited in the file of this patent
UNITED STATES PATENTS

| | | |
|---|---|---|
| 1,144,685 | Bernia | June 29, 1915 |
| 1,436,344 | Hickey | Nov. 21, 1922 |
| 2,499,052 | Brookins | Feb. 28, 1950 |
| 2,520,033 | Fuelling | Aug. 22, 1950 |